No. 641,293. Patented Jan. 16, 1900.
L. HOLLAND-LETZ.
CORN HUSKING AND STALK CUTTING MACHINE.
(Application filed Aug. 30, 1895. Renewed Nov. 1, 1899.)
(No Model.) 7 Sheets—Sheet 2.

No. 641,293. Patented Jan. 16, 1900.
L. HOLLAND-LETZ.
CORN HUSKING AND STALK CUTTING MACHINE.
(Application filed Aug. 30, 1895. Renewed Nov. 1, 1899.)
(No Model.) 7 Sheets—Sheet 3.

No. 641,293. Patented Jan. 16, 1900.
L. HOLLAND-LETZ.
CORN HUSKING AND STALK CUTTING MACHINE.
(Application filed Aug. 30, 1895. Renewed Nov. 1, 1899.)
(No Model.) 7 Sheets—Sheet 4.

Witnesses:
W. C. Coolies
Jno. A. Christianson.

Inventor:
Louis Holland-Letz
By Harry Cobb Kennedy
Attys.

No. 641,293. Patented Jan. 16, 1900.
L. HOLLAND-LETZ.
CORN HUSKING AND STALK CUTTING MACHINE.
(Application filed Aug. 30, 1895. Renewed Nov. 1, 1899.)

(No Model.) 7 Sheets—Sheet 7.

Fig. 12.

Witnesses:
W. C. Corliss
Jno. A. Christiansen

Inventor.
Louis Holland-Letz
By Cobb & Kennedy
Attys

UNITED STATES PATENT OFFICE.

LOUIS HOLLAND-LETZ, OF CROWN POINT, INDIANA.

CORN-HUSKING AND STALK-CUTTING MACHINE.

SPECIFICATION forming part of Letters Patent No. 641,293, dated January 16, 1900.

Application filed August 30, 1895. Renewed November 1, 1899. Serial No. 735,545. (No model.)

*To all whom it may concern:*

Be it known that I, LOUIS HOLLAND-LETZ, a citizen of the United States, residing at Crown Point, in the county of Lake and State of Indiana, have invented certain new and useful Improvements in Corn-Husking and Stalk-Cutting Machines; and I do hereby declare the following to be a full, clear, and exact description of the invention, such as will enable others skilled in the art to which it appertains to make and use the same.

This invention relates to a novel construction in a corn-husking and stalk splitting and cutting machine, the object being to provide a machine of the kind specified of simple and durable construction and efficient operation; and it consists in the features of construction and combinations of parts hereinafter fully described and specifically claimed.

In the accompanying drawings, illustrating my invention, Fig. 10$^a$ is a sectional detail on the line 10$^a$ 10$^a$ of Fig. 10.

Figure 1:
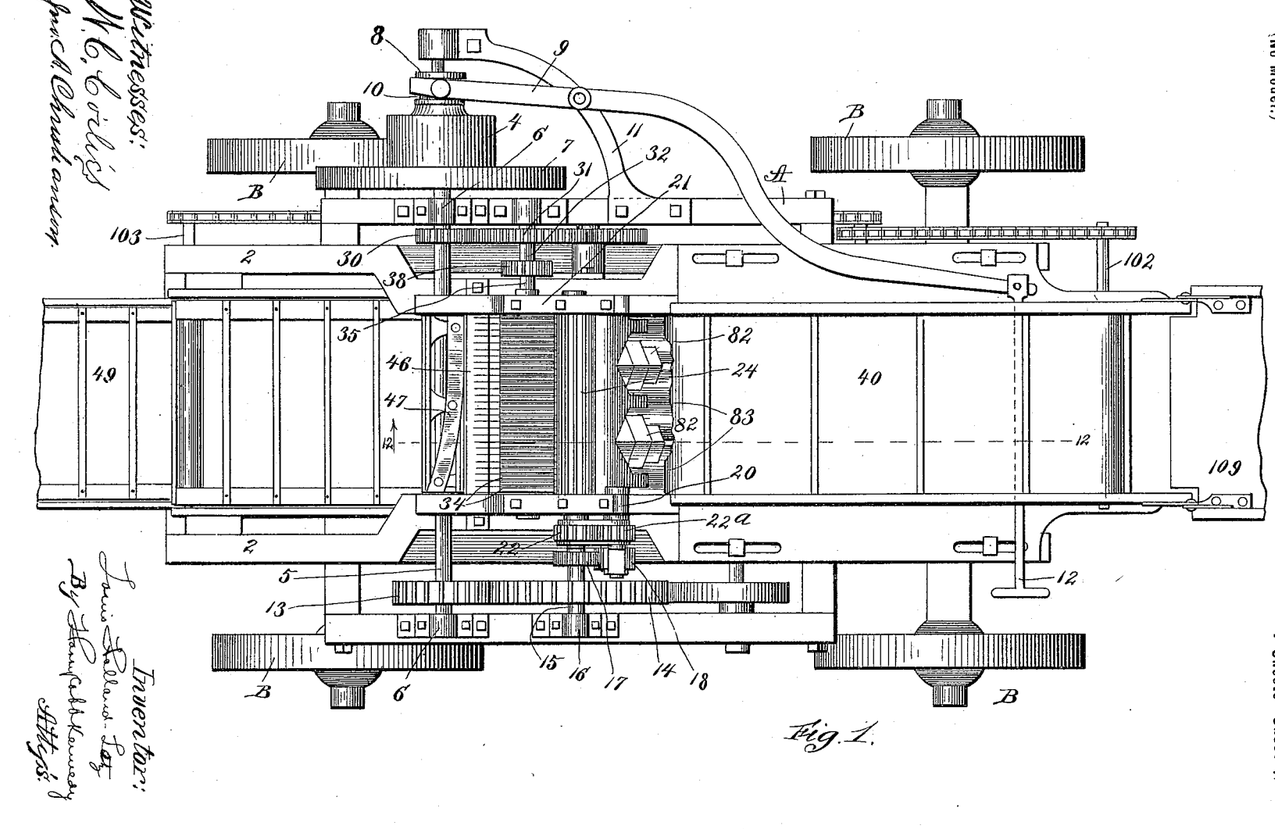
Figure 1 is a top plan view of a machine constructed in accordance with my invention.
Figures 2, 11:
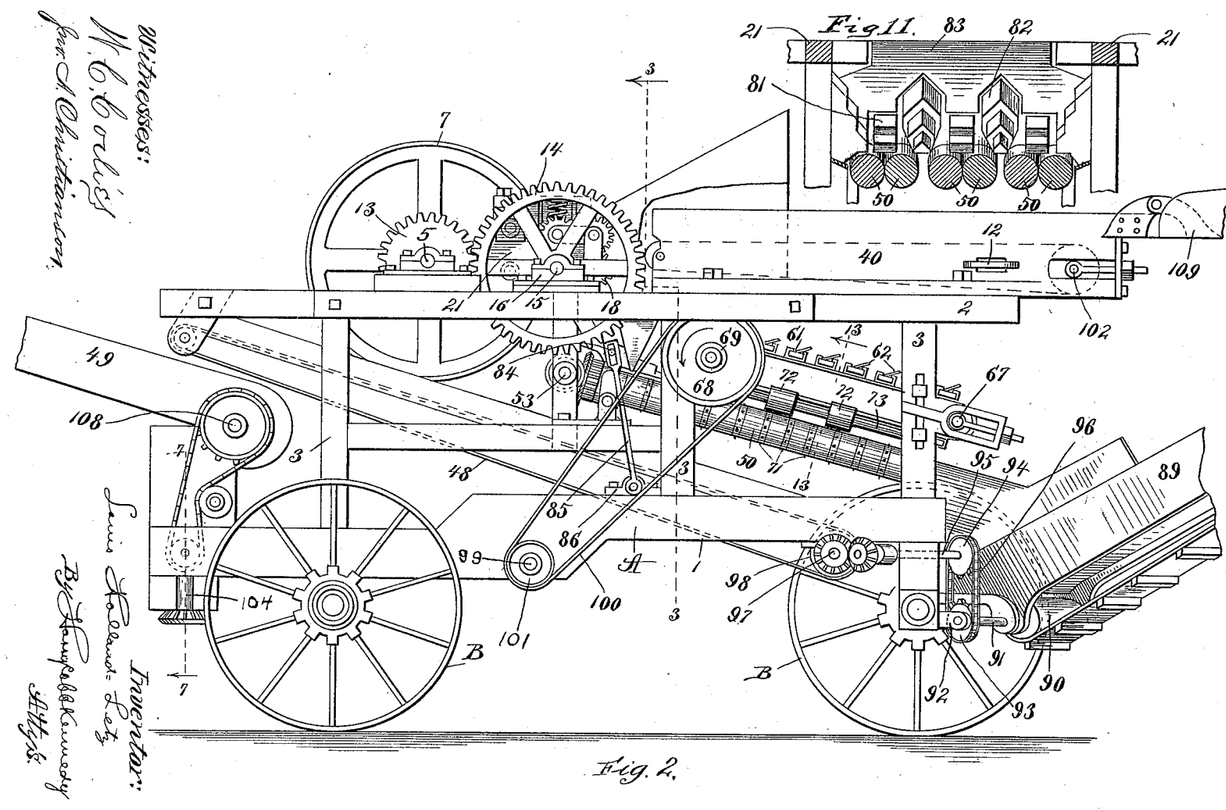
Fig. 2 is a side elevation of same.
Fig. 11 is a detail sectional view showing the relative positions of said fingers and rollers.
Figure 3:
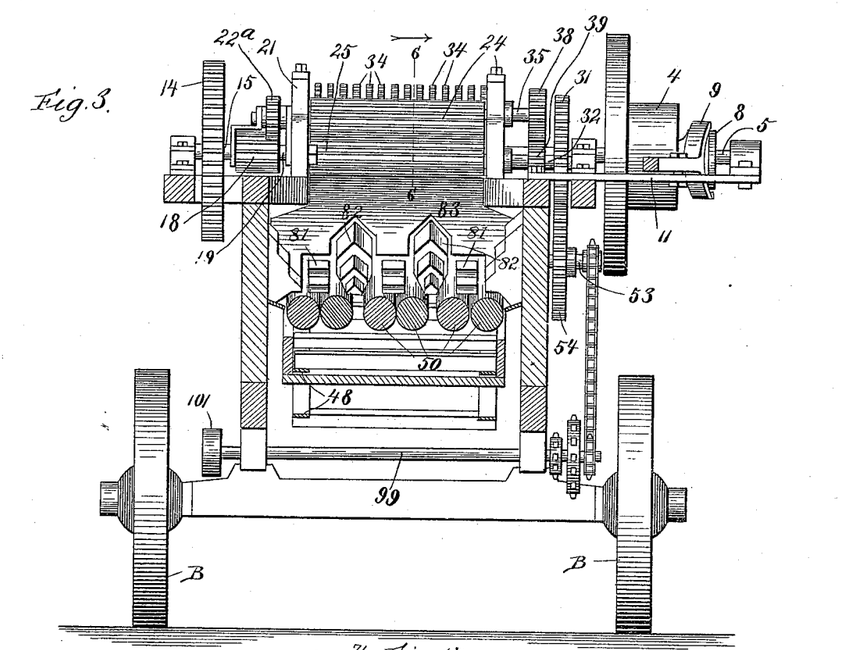
Fig. 3 is a transverse sectional view of the same, taken on the line 3 3 of Fig. 2.
Figures 4, 5, 7, 15:
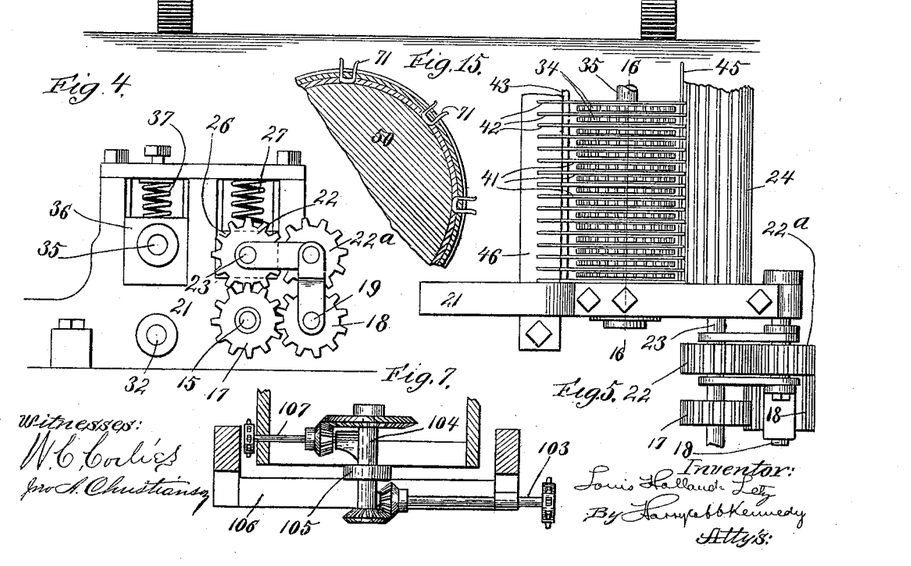
Fig. 4 is a detail side elevation of the gearing I employ to operate the rollers for separating the ear from the stalk.
Fig. 5 is a detail plan view of said rollers and gearing to operate the same.
Fig. 7 is a detail sectional view showing the manner of transmitting power from one portion of my machine to another.
Fig. 15 is a detail sectional view of a roller for removing the husks from the ears and showing the manner of securing the pins thereto.
Figures 6, 13, 14:
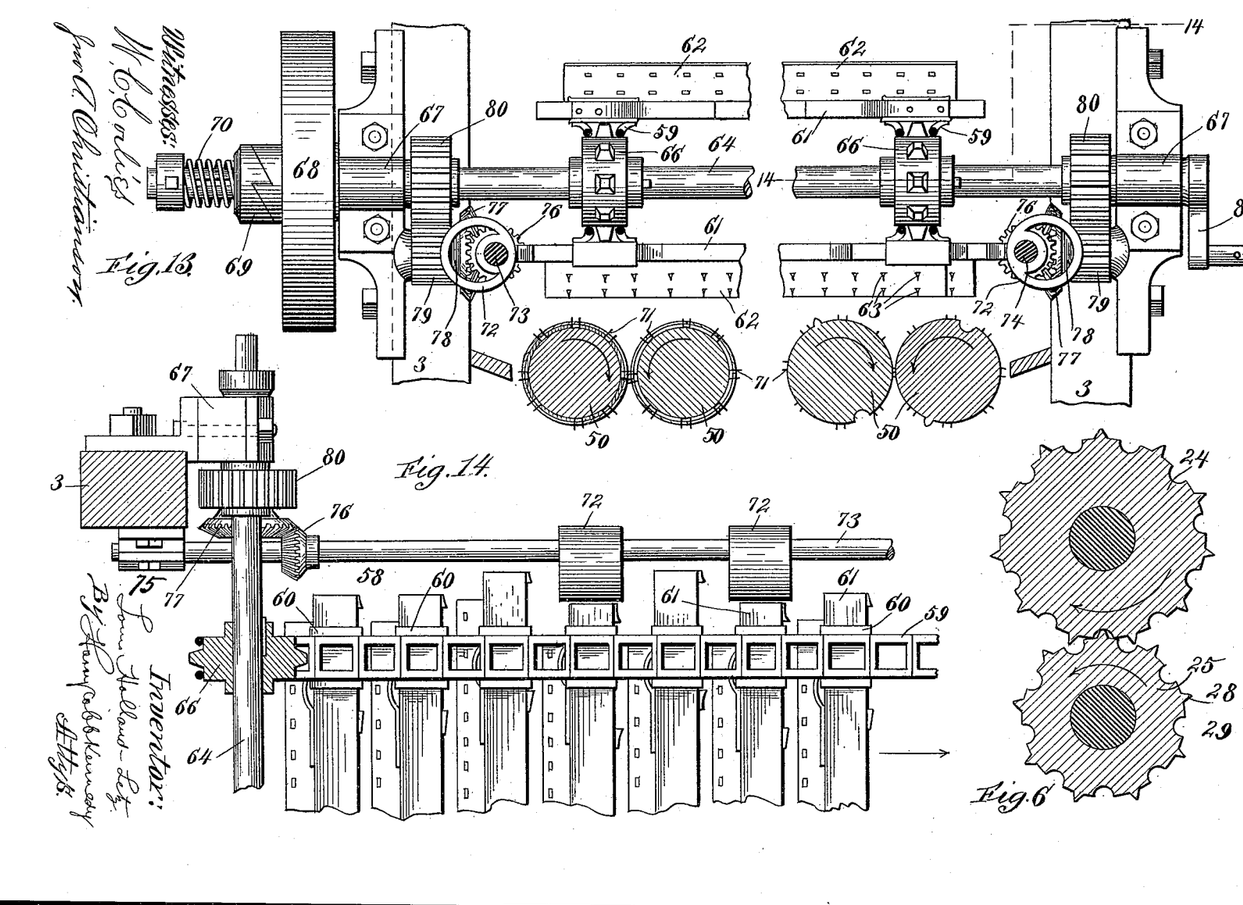
Fig. 6 is a detail sectional view of said rollers, taken on the line 6 6 of Fig. 3.
Fig. 13 is a detail sectional view of the devices for removing the husks from the ears, taken on the line 13 13 of Fig. 2.
Fig. 14 is a detail sectional view of the same, taken on the line 14 14 of Fig. 13.
Figure 8:
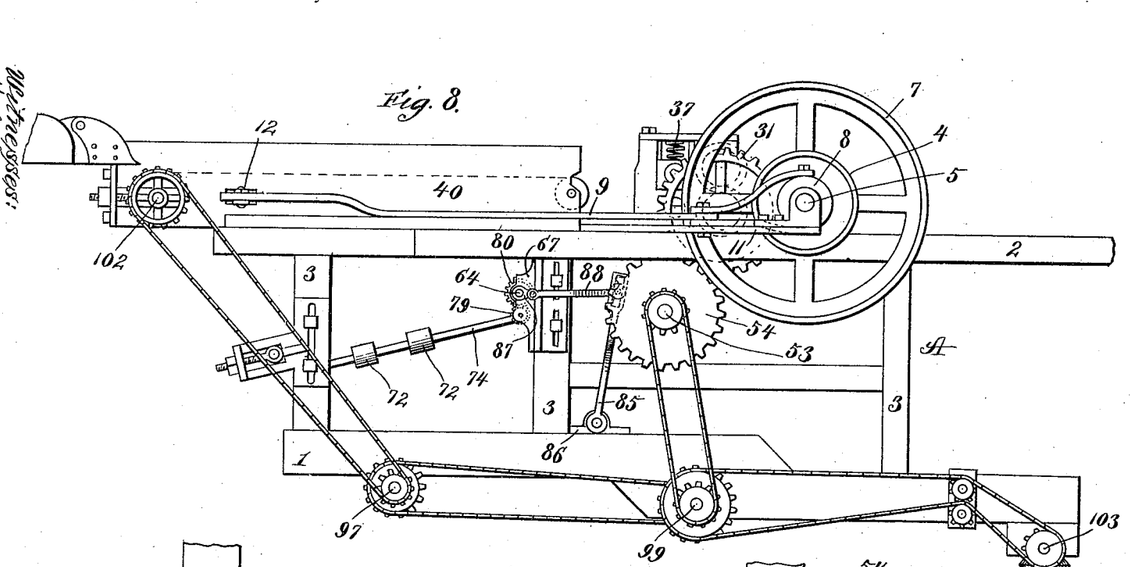
Fig. 8 is a detail side elevation of said machine, showing the transmission of power to operate the various parts of the same.
Figures 9, 16:
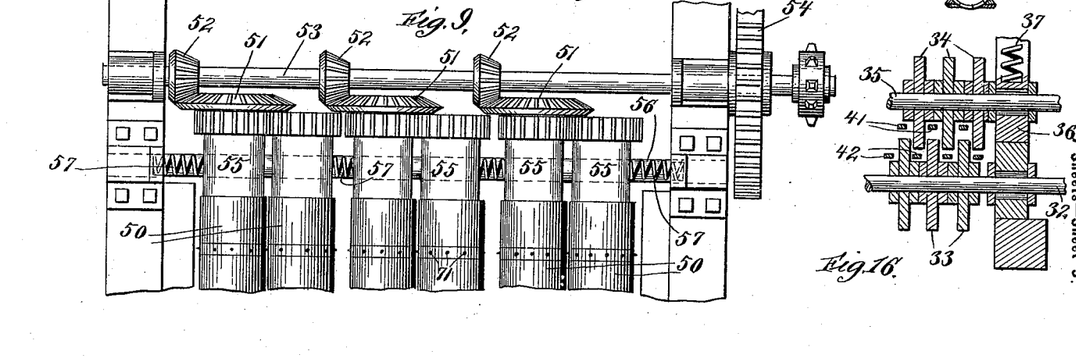
Fig. 9 is a detail plan view of the rollers designed to remove the husks from the ears.
Fig. 16 is a detail sectional view of the rollers to cut the stalks in strips, taken on the line 16 16 of Fig. 5.
Figure 10:
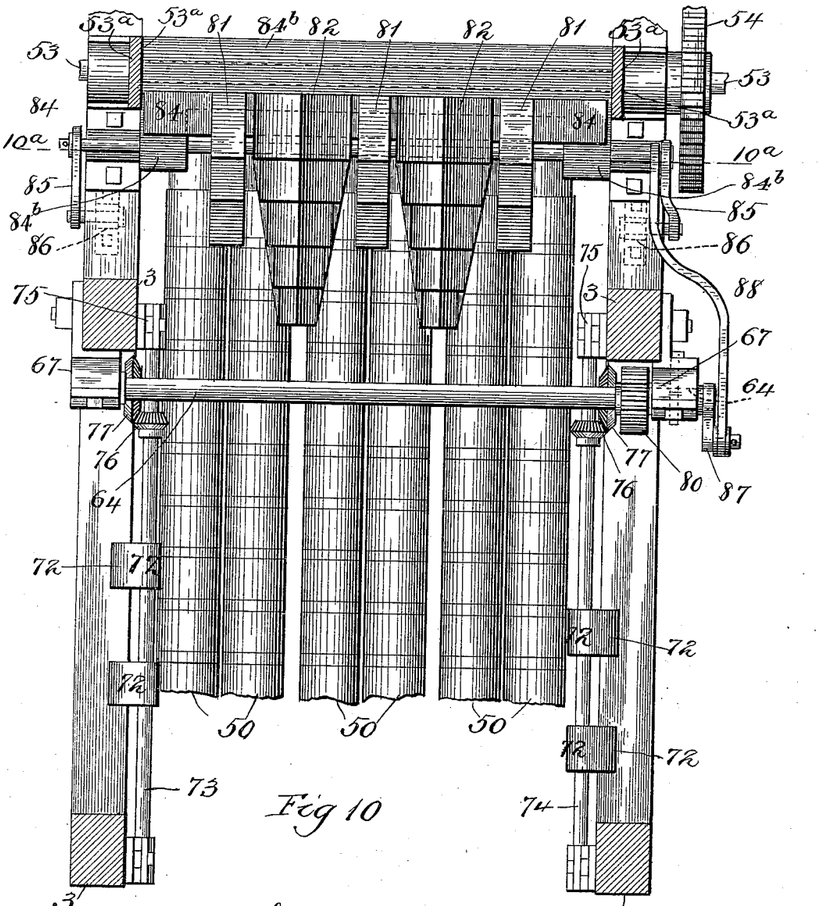
Fig. 10 is a plan section taken above the husking-rolls, the carrier being removed.
Figure 10A:
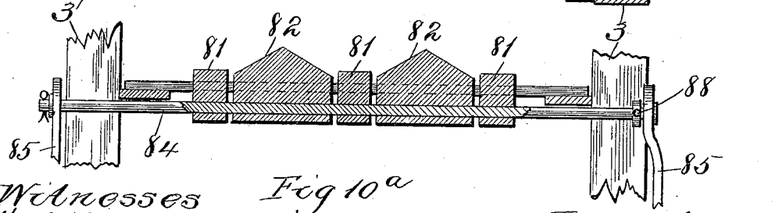
Figure 12:
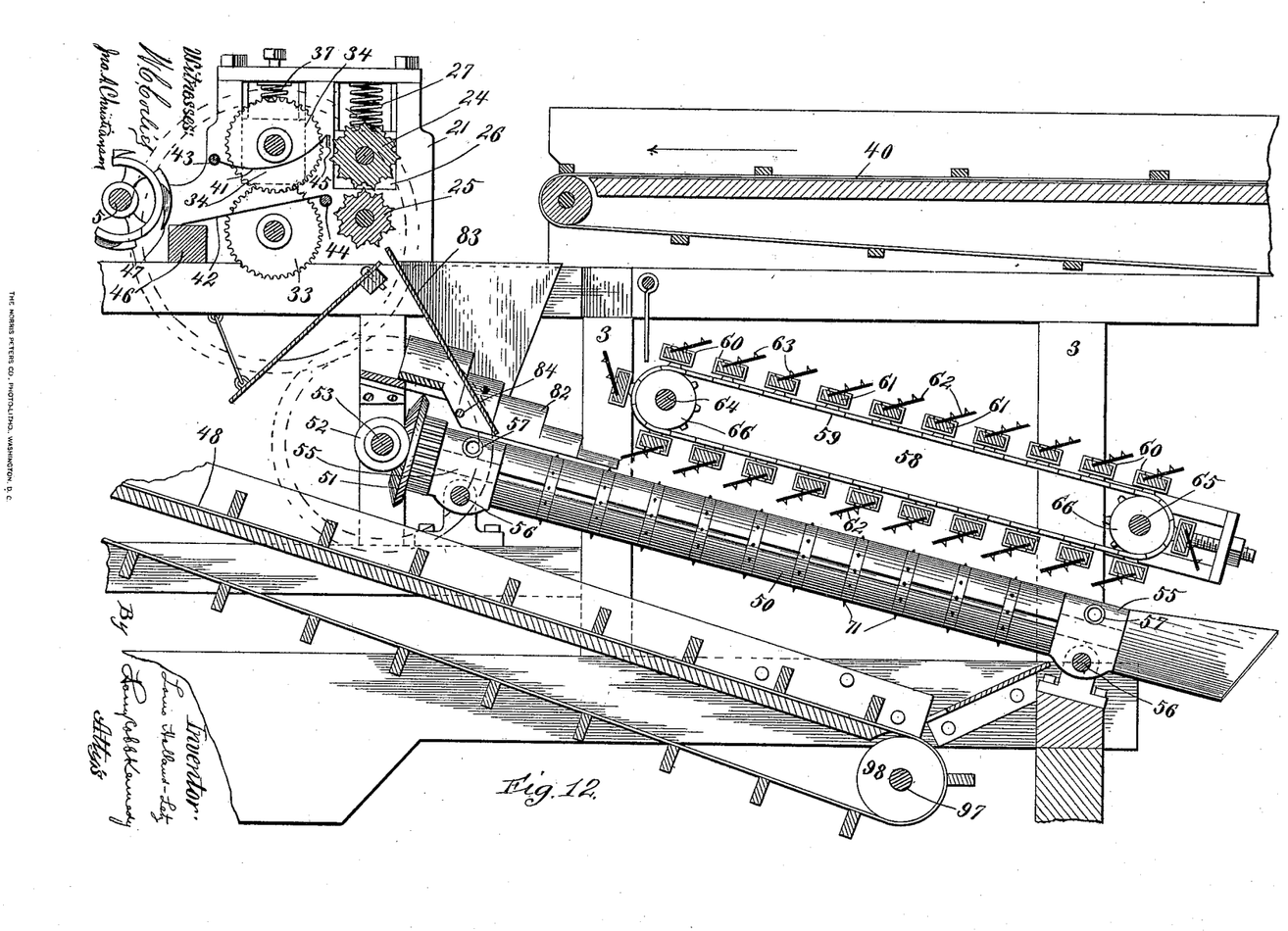
Fig. 12 is a central longitudinal section of the machine, taken on the line 12 12 of Fig. 1.

Referring now to said drawings, A indicates the frame of the machine, which is supported upon wheels B for ease in transportation. Said frame A consists of lower beams 1 and upper beams 2, supported upon uprights 3, secured to said lower beams 1. Upon said frame A the working parts of said machine are supported. Power is transmitted to said machine through the pulley 4, secured at the end of a shaft 5, mounted in bearings 6 on the frame of said machine, near the rear end of same. A fly-wheel 7 is mounted upon said shaft 5, adjacent said pulley 4, to give a more steady motion to said machine. Said pulley 4 is loosely mounted upon said shaft 5 and is adapted to engage a clutch 8, which is keyed upon said shaft 5 and is adapted to be thrown into or out of engagement with said pulley 4 by a lever 9, having a forked end adapted to engage a groove 10 in said clutch 8, said lever 9 being pivoted to an arm 11, secured to the frame of the machine and supported at its other end by said shaft 5. The other end of said lever 9 extends to a point near the front of said machine and is pivotally connected with a rod 12, extending to the opposite side of the machine to enable the operator to control the working of the machine from either side thereof. Mounted upon said shaft 5 is a cog-wheel 13, which intermeshes with a cog-wheel 14 on the shaft 15, which is mounted in bearings 16 on the frame of the machine. Mounted upon said shaft 15 adjacent said cog-wheel 14 is a pinion 17, which intermeshes with a pinion 18 on a stud 19, running in a bearing 20 in the frame 21, mounted upon said machine and carrying the devices for separating the ears from the stalk and cutting the stalk. Said pinion 18 is geared to a pinion 22 on the end of a shaft 23 by means of an intermediate pinion 22$^a$. Said shaft 23 runs in bearings in said frame 21 and carries the upper one of the rollers 24 and 25, said roller 25 being carried by said shaft 15. Said roller 24 is mounted in sliding bearings 26 in said frame 21 and is adapted to be pressed down upon said roller 25 by means of springs 27. Said rollers 24 and 25 are designed to break the ears from the stalk as the latter passes between them and to this end are provided with teeth 28, which project outwardly from said rollers and enter grooves 29 in each of said rollers, said grooves being situated midway between said teeth. By means of this construction of the rollers the ears are broken from the stem very close to the cob, and there is no danger of the ears being drawn through the rollers. Mounted upon said shaft 5 is a cog-wheel 30, which intermeshes with a cog-wheel 31 on a shaft 32, running in bearings in said frame 21 and carrying a series of rollers 33, situated at regular intervals on said shaft 32 and running alternately between rollers 34 on a shaft 35, running in sliding bearing 36 in said frame 21, said sliding bearings 36 being held at the lower limit of their movement by springs 37. Said shaft 35 carries a cog-wheel 38, which intermeshes with a cog-wheel 39 on said shaft 32. The corn is fed to said rollers 24 and 25 from a feed-belt 40, and as it passes between said rollers it is crushed and the ears are broken therefrom. As it leaves said rollers 24 and 25 it passes between the rollers 33 and 34, which are provided with rough edges to enable them to take a better hold on the stalks, and by means of their position with relation to each other the stalks are cut into strips. To prevent said stalks from sticking between said rollers and clogging the machine, I introduce arms 41 and 42 between the same, said arms being secured at one end to rods 43 and 44, running transversely across said frame 21. The other ends of said arms 41 are bent over a rod 45, running transversely across said frame 21, and the other ends of said arms 42 rest upon a beam 46, extending across said machine. As the stalks leave said rollers 33 and 34 they are cut into small pieces by revolving knives 47, carried by said shaft 5 and running very close to said beam 46. The small pieces of the stalk then fall upon a conveyer-belt 48, which carries them upwardly and drops them into a conveyer 49, which carries them beyond the end of the machine and drops them into any suitable receptacle. As the ears are separated from the stalk they fall down into the husking devices, where the husks are removed therefrom. The said husking devices consist of a series of rollers 50, arranged in pairs, the rollers of each pair being geared to each other and driven by a miter gear-wheel 51, surmounted upon the end of one of said rollers of each pair, which is driven by a miter-gear 52 on a shaft 53, journaled in suitable boxes carried by uprights 53$^a$, secured to the side framing of the machine. The said shaft 53 receives its motion through the cog-wheel 54, mounted at one end thereof and intermeshing with said cog-wheel 31. Said rollers 50 are mounted in bearings 55, movably mounted upon rods 56, and are held in position by means of springs 57, interposed between each of said pairs of rollers 50. Running parallel with the length of said rollers 50 and coacting therewith is a belt 58, composed of sprocket-chains 59, carrying guide-blocks 60, in which slats 61, running transversely across said sprocket-chains, are adapted to slide. Said slats 61 are provided with projecting flaps or aprons 62, of leather or any other suitable material, which are provided with pins 63. Said belt 58 runs over sprocket-wheels 66, which are mounted upon shafts 64 and 65, the shaft 64 running in boxes 67, secured to the uprights 3, located near the upper ends of the rollers 50, and the shaft 65 running in adjustable boxes 67$^a$, carried by brackets 67$^b$, secured to the end uprights 3 at the front of the machine and controlled by screw-bolts 67$^c$, mounted therein. Said shafts 64 and 65 are driven from a pulley 68, loosely mounted upon the end of said shaft 64 and adapted to be thrown into or out of engagement therewith by a clutch 69, keyed upon said shaft, and adapted to be held in engagement with said pulley by a spring 70. Said rollers 50 are also provided with pins 71, which are adapted to catch in the husks and tear the same from the ears. The said slats 61 are designed to move from side to side as they pass over said rollers 50, so as to turn and rub the ears held between the belt and said rollers in order to loosen the husks, so that they will come off the ears with ease. This side motion is given to said slats 61 by a series of eccentrics 72, mounted upon shafts 73 and 74, running parallel with said belt in bearings 75, secured to said uprights 3. Said eccentrics 72 are situated so as to throw the slats 61 alternately from side to side, each slat being engaged alternately by an eccentric 72 on each of said shafts 73 and 74. Said shafts 73 and 74 are driven by miter-gears 77 on studs 78, said studs 78 being driven by cog-wheels 79, mounted thereon, which intermesh with cog-wheels 80 on said shaft 64.

While I prefer to so construct the machine that the slats 61 reciprocate laterally independently of each other and that adjacent slats move in opposite directions, I do not desire to be limited to this construction, my invention consisting, broadly, in the carrying mechanism for moving the ears longitudinally as to the stripping-rolls, such mechanism having a lateral reciprocation either in its entirety or sectionally for the purpose of turning and abrading the ear of corn being operated upon.

To provide a more perfect feed for said husking devices, I provide pushing-fingers 81 and guide-fingers 82, which pass through openings in the deflector 83 and have a forward-and-backward movement and serve to push and guide the ears into said husking devices. Said pushing-fingers 81 are situated over each pair of the rollers 50 and are of rectangular shape, while said guide-fingers 82 are situated between said pairs of rollers 50 and are of a triangular shape, so as to throw the ears upon the pairs of rollers on each side thereof. The said forward-and-backward movement is imparted to said pushing and guide fingers by a shaft 84, passing transversely through the same and having its ends secured in the slotted ends of vibrating arms 85, pivoted in bearings 86 on said beams 1. The said vibrating motion is imparted to said arms 85 by the crank 87 at the end of the shaft 64, to which said arms are connected by a connecting-rod 88. The rearward ends of the fingers 81 82 rest upon a plate 84ª, which slides upon a cross-plate 84ᵇ, secured to the uprights 53ª. As the ears pass through said husking devices the husks are torn therefrom and are drawn through the rollers 50 and dropped into said conveyer 48 and so carried upwardly and mixed with the fine-cut stalks to be used for fodder. As the ears leave said husking devices they drop into a conveyer 89, which carries them upwardly and drops them into any suitable receptacle. The said conveyer 89 runs over a pulley 90 on a shaft 91, running in bearings 92 on the frame of the machine adjacent to the bearings for the axles of the wheels. Said shaft 91 is driven by a sprocket-wheel 93, mounted thereon, which is geared to a sprocket-wheel 94, mounted on a shaft 95, by a sprocket-chain 96. Said shaft 95 is mounted in bearings on said beam 1 and is geared to the shaft 97, carrying a pulley 98, over which said conveyer 48 runs. Said shaft 97 is geared to the shaft 99, which in turn is geared to the shaft 53. From said shaft 99 the pulley 68 is driven by a belt 100, running over said pulley 68 and a pulley 101 at the end of said shaft 99. Said conveyer 40 is driven from the shaft 97, to which the shaft 102, carrying the pulley over which said conveyer runs, is geared. Geared to said shaft 99 is a shaft 103, which is geared to a vertical shaft 104, running in bearing 105 in a cross-beam 106 at the rear end of said machine. Said shaft 104 is geared to a horizontal shaft 107, which in turn is geared to a shaft 108, carrying the pulley over which the conveyer 49 runs. For greater convenience in feeding my machine I provide a feed-table 109, which is to said machine adjacent said conveyer 40, so that the corn may be pushed from the same onto the conveyer 40. Said feed-table is adapted to be folded over upon said conveyer 40 when the machine is not in operation. Said conveyers 49 and 89 are also adapted to be detached and laid upon the top of said machine for greater ease in transportation. I also provide devices for tightening said conveyer-belts, which I have omitted to describe as being obvious.

I do not, of course, wish to be limited to the details of construction herein described, as many parts could obviously be varied without departing from the spirit of my invention.

I claim as my invention—

1. In a machine of the kind specified, the combination with devices for crushing the stalk and breaking the ears therefrom, devices for cutting said stalk transversely into small pieces, of devices for cutting said stalk longitudinally into strips consisting of rollers 33 and 34 provided with interfitting serrated disks adapted to shear said stalks, said rollers being situated between said stalk-crushing devices and said devices for cutting said stalks transversely, and devices situated between the disks of said rollers for preventing the strips of said stalks from curling up between said disks.

2. In a machine of the kind specified, the combination with devices for crushing the stalk and breaking the ears therefrom, devices for removing the husks from the ears, devices for cutting the stalk transversely into small pieces, of devices situated between said crushing devices and said cutting devices, for cutting said stalks longitudinally into strips, consisting of rollers 33 and 34 situated one above the other and provided with interfitting serrated disks of less width than said stalks, which are adapted to shear said stalk, and devices situated between the disks of said rollers for preventing the strips of said stalks from curling up between said disks.

3. In a machine of the kind specified, the combination with devices for separating the ears of corn from the stalk, of devices for removing the husks from said ears consisting of rollers provided with pins or teeth to tear said husks, a belt consisting of a series of movable slats adapted to pass over said ears and rub the same to loosen said husks, and devices for moving said slats from side to side.

4. In a machine of the kind specified, the combination with devices for separating the ears of corn from the stalk, of devices for removing the husks from said ears consisting of rollers provided with pins or teeth to tear said husks and remove the same, a belt consisting of a series of movable slats adapted to pass over said ears and rub the same to loosen the said husks, and devices for moving said slats from side to side consisting of a series of eccentrics mounted upon shafts adjacent the ends of said slats and adapted to throw said slats alternately in opposite directions at every revolution.

5. In a machine of the kind specified, a feed-belt to feed the cornstalks thereto, devices for separating the ears from said stalks, devices for cutting said stalks into small pieces and removing the same, and devices for removing the husks from said ears consisting of rollers provided with pins or teeth to tear said husks, a belt consisting of a series of movable slats adapted to pass over said ears and rub the same to loosen said husks, and devices for moving said slats from side to side.

6. In a machine of the kind specified, a feed-belt to feed the cornstalks thereto, devices for separating the ears from said stalks, devices for cutting said stalks into small pieces and removing the same, and devices for removing the husks from said ears consisting of a plurality of sets of rollers geared to each other and provided with pins or teeth to tear the husks from said ears, and a belt having laterally-reciprocating slats coacting with said rollers and adapted to loosen said husks on said ears and move said ears toward their exit from said husking devices.

7. In a machine of the kind specified, the combination with rollers adapted to tear the husks from the ears of corn, of devices for feeding said ears of corn to said rollers consisting of a plurality of reciprocating fingers situated between each pair of said rollers and adjacent the outside rollers, said fingers being adapted to guide said ears of corn away from the spaces between each pair of rollers and onto said rollers.

8. In a machine of the kind specified, the combination with rollers adapted to tear the husks from the ears of corn, of devices for loosening said husks on said ears consisting of a belt provided with laterally-movable slats adapted to pass over said ears, said slats being moved alternately from side to side during the passage of said belt by means of eccentrics mounted upon shafts running parallel with the edges of said belt and adapted to engage said slats at their ends.

9. In a machine of the kind specified, the combination with rollers adapted to tear the husks from the ears of corn, of devices for loosening said husks on said ears consisting of a belt provided with laterally-movable slats adapted to pass over said ears, said slats being moved alternately from side to side during the passage of said belt by means of eccentrics mounted upon shafts running parallel with the edges of said belt, said eccentrics being situated to engage the opposite ends of adjacent slats to move said slats in opposite directions.

10. In a machine of the kind specified, devices for separating the ears of corn from the stalk and crushing said stalk, devices for cutting said stalk longitudinally into strips, devices for cutting said strips transversely into small pieces, rollers for removing the husks from the ears, and devices situated between said husking devices and said crushing and cutting devices for feeding said ears into said husking devices consisting of a plurality of reciprocating fingers of irregular contour so situated with relation to said husking-rollers as to guide said ears over each pair of coacting husking-rollers, substantially as described.

11. In a machine of the kind specified, a feed-belt adapted to feed cornstalks into the same, devices for separating the ears from said stalks and cutting said stalks consisting of rollers 24 and 25 adapted to crush said stalks and separate the ears therefrom, rollers 33 and 34 adapted to cut said stalks into strips, and knives adapted to cut said strips transversely into small pieces, devices for removing the husks from said ears consisting of a plurality of rollers having pins or teeth to tear the husks, and a belt having movable slats to loosen said husks on said ears, devices for feeding said ears into said husking devices consisting of fingers situated in front of said husking devices and adapted to push said ears into the same at regular intervals, devices for removing said husks and said small pieces of said stalks and mixing the same consisting of conveyers 48 and 49 situated beneath said husking devices and said stalk-cutting devices and adapted to carry the products thereof and drop them into any suitable receptacle, and devices for removing said ears consisting of a conveyer 89 adapted to carry said ears and drop them into a receptacle, substantially as described.

12. In a corn-husking machine the combination with a pair of stripping-rolls, of turning and abrading plates for acting conjointly with the rolls, and means for imparting to such plates a reciprocatory movement transverse to the rolls.

13. In a corn-husking machine the combination with stripping-rolls arranged in pairs, of devices for feeding ears along the rolls, and means for giving such devices a lateral reciprocation to turn the ears.

14. In a corn-husking machine the combination with stripping-rolls arranged in pairs, of a carrier for conveying the corn along the rolls and having transverse movable slats and means for causing the reciprocation of the slats transversely as to the rolls, and for causing adjacent slats to move in opposite directions.

15. In a corn-husking machine, the combination with husking-rollers arranged in pairs, of abrading-plates mounted above the rollers and adapted to engage ears of corn lying thereupon; and means for causing the reciprocation of such plates transversely as to the rollers, adjacent plates being moved in opposite directions.

16. In a corn-husker, the combination with husking-rolls arranged in pairs for tearing the husks from the ears, of reciprocating abrading-plates for engaging the ears.

17. In a corn-husker, the combination with husking-rolls arranged in pairs for tearing the husks from the ears, of reciprocating abrading-plates for engaging the ears, adjacent plates moving in opposite directions.

18. In a corn-husking machine, the combination with snapping-rolls, and with husking-rolls arranged in pairs and receiving the ears as they fall from the snapping-rolls, of guide-fingers for directing the ears to the husking-rolls, and pushers located between the guides and reciprocating to and from the receiving ends of the husking-rolls.

19. In a corn-husker, the combination with snapping-rolls and with husking-rolls arranged in pairs and receiving the ears as they fall from the snapping-rolls, of a chute or deflecting-plate leading from the snapping-rolls toward the husking-rolls, guide-fingers, 82, projecting upwardly from such chute or plate intermediate of each pair of husking-rolls, and having their sides inclined.

20. In a corn-husker, the combination with snapping-rolls, and with husking-rolls arranged in pairs and receiving the ears as they fall from the snapping-rolls, of a chute or deflecting-plate leading from the snapping-rolls toward the husking-rolls, guide-fingers, 82, projecting forwardly from said chute or plate intermediate of each pair of husking-rolls, and having their sides inclined, and pushing-fingers located between the guide-fingers and having a longitudinal reciprocation.

21. In a corn-husking machine, the combination with snapping-rolls, and with husking-rolls receiving the ears as they fall from the snapping-rolls and being arranged in pairs, of a chute or deflecting-plate for conveying the ears as they so fall, guide-fingers projecting forward from such chute or plate intermediate of adjacent pairs of husking-rolls and having their sides inclined, and pusher-fingers located between such guide-fingers, both sets of fingers having a longitudinal reciprocation.

In testimony whereof I affix my signature in presence of two witnesses.

LOUIS HOLLAND-LETZ.

Witnesses:
RUDOLPH WM. LOTZ,
HARRY COBB KENNEDY.